United States Patent
Bastani et al.

(10) Patent No.: US 8,967,757 B2
(45) Date of Patent: Mar. 3, 2015

(54) SYSTEMS AND METHODS FOR PRINT HEAD CALIBRATION

(75) Inventors: Behnam Bastani, San Diego, CA (US); David Luis Pereira, San Diego, CA (US); Jose Ramos, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1687 days.

(21) Appl. No.: 12/253,133

(22) Filed: Oct. 16, 2008

(65) Prior Publication Data
US 2009/0195581 A1    Aug. 6, 2009

Related U.S. Application Data

(60) Provisional application No. 61/026,111, filed on Feb. 4, 2008.

(51) Int. Cl.
*B41J 29/393* (2006.01)
*H04N 1/401* (2006.01)

(52) U.S. Cl.
CPC .............. *B41J 29/393* (2013.01); *H04N 1/4015* (2013.01)
USPC ............................................................ 347/19

(58) Field of Classification Search
USPC ............................................................ 347/19
See application file for complete search history.

(56) References Cited

U.S. PATENT DOCUMENTS

| | | | | |
|---|---|---|---|---|
| 5,057,854 A | * | 10/1991 | Pond et al. | 347/42 |
| 5,276,459 A | * | 1/1994 | Danzuka et al. | 347/19 |
| 5,596,353 A | * | 1/1997 | Takada et al. | 347/19 |
| 5,719,602 A | | 2/1998 | Hackleman et al. | |
| 5,742,305 A | | 4/1998 | Hackleman | |
| 2005/0205667 A1 | * | 9/2005 | Rowe | 235/382 |
| 2007/0013928 A1 | * | 1/2007 | Kang et al. | 358/1.9 |

* cited by examiner

Primary Examiner — Julian Huffman
(74) Attorney, Agent, or Firm — Trenner Law Firm, LLC

(57) ABSTRACT

Systems and methods for print head calibration. In an exemplary embodiment, the method may include scanning an image on a print media to obtain an optical density profile. The method may also include selecting at least one window in the optical density profile. The method may also include generating an average profile for each window. The method may also include identifying variations in uniformity.

15 Claims, 7 Drawing Sheets

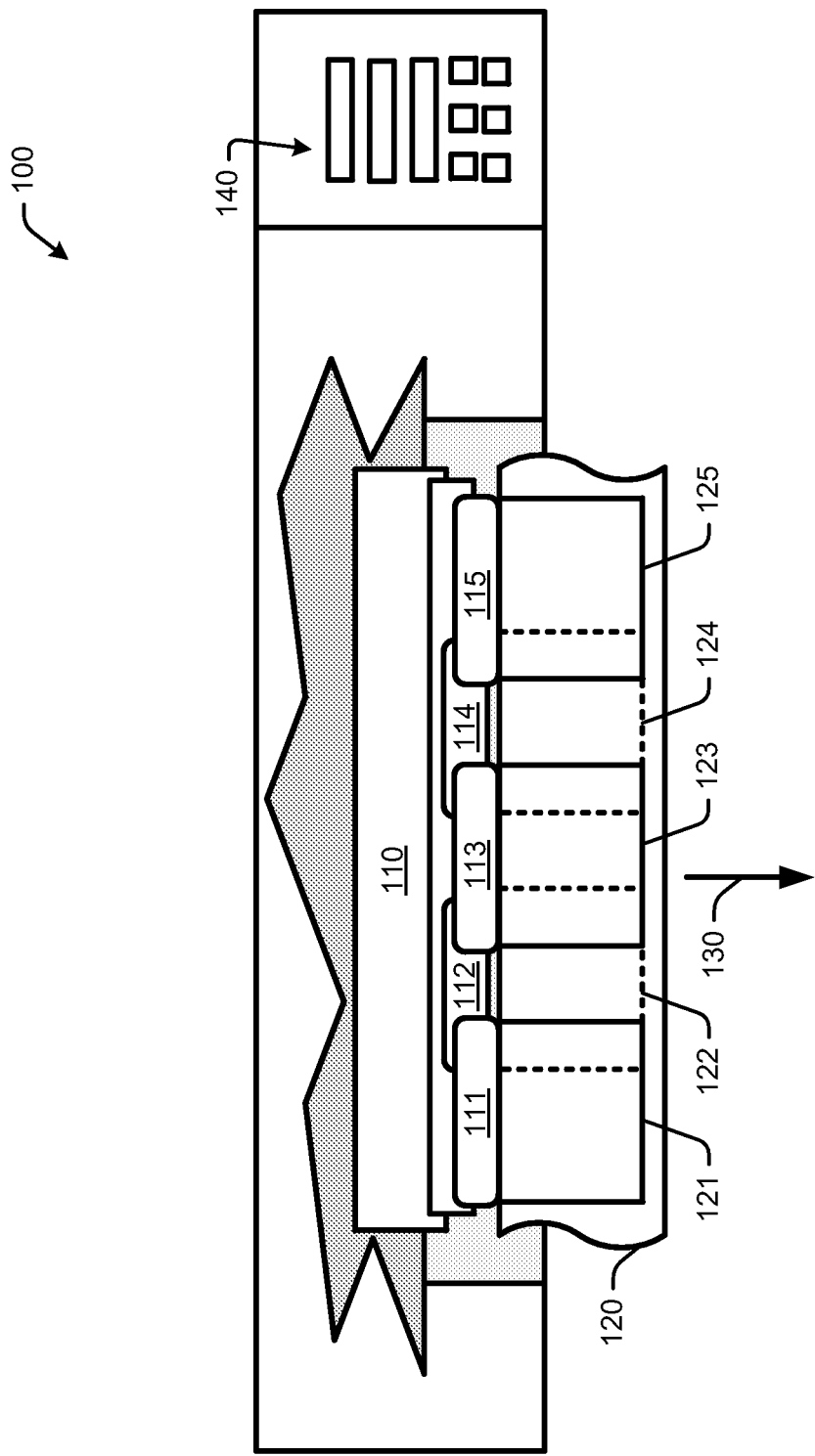

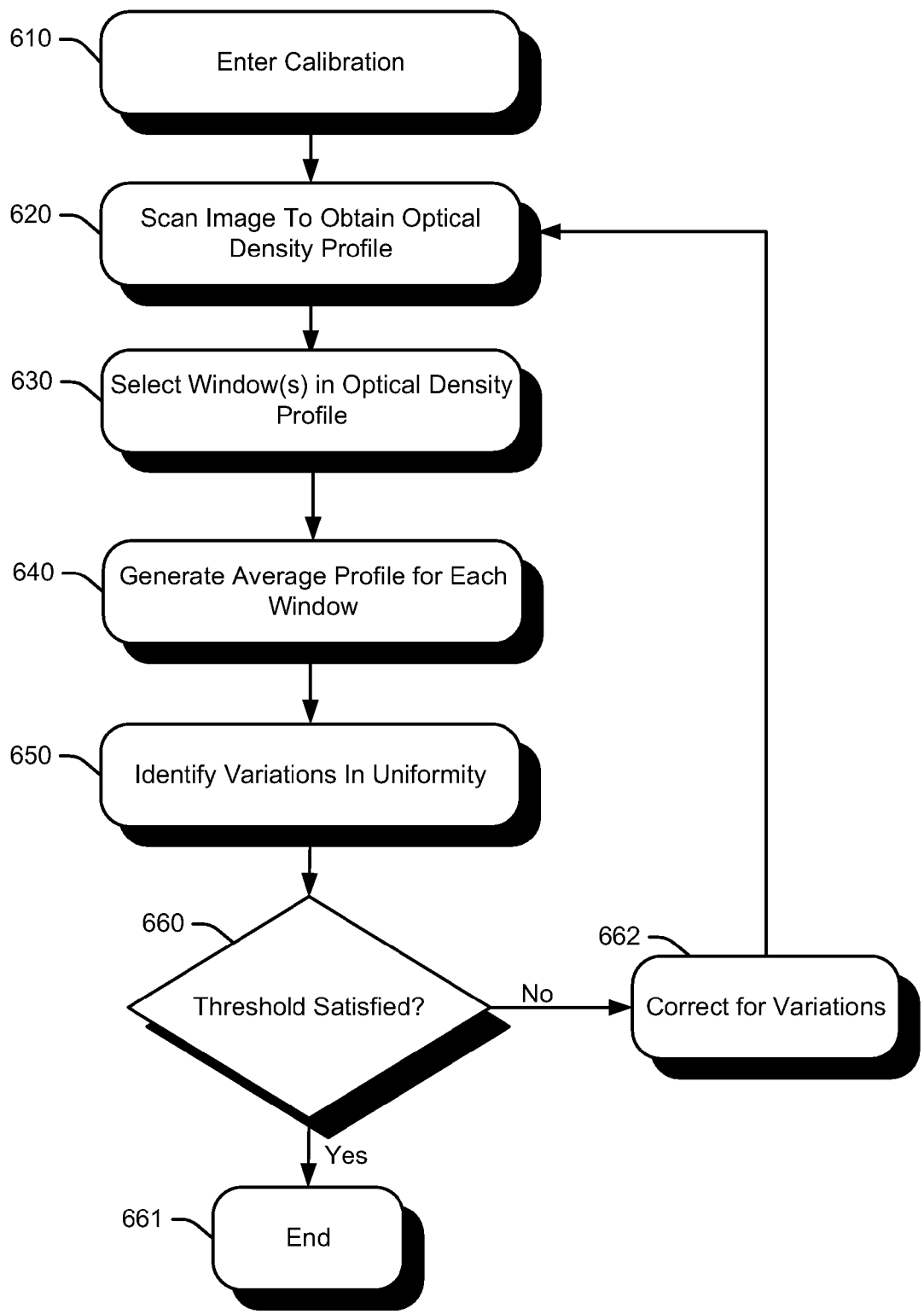

SYSTEMS AND METHODS FOR PRINT HEAD CALIBRATION

CROSS REFERENCE TO RELATED APPLICATIONS

This Application claims the benefit of provisional patent application Ser. No. 61/026,111, filed Feb. 4, 2008 titled "Systems And Methods For Print Head Calibration" which application is incorporated by reference herein as if reproduced in full below.

BACKGROUND

Color printers have become increasingly more commonplace with advances in printing technologies. High-quality color printers are readily commercially available in a wide variety of sizes and prices ranging from portable and desktop printers for use at home or at the office, to large commercial-grade printers.

Traditionally, printers were used primarily for printing text documents. Today, however, color printers are available and are routinely used to print complex images, such as digital photographs. Often it is difficult to distinguish color printed images from developed film photographs.

Achieving color uniformity is one of the most challenging aspects in color printing. Evaluating the print quality becomes more challenging when a multi-die print head is used, such as those used for Page Wide Array (PWA) printing. Print quality defects range from die density variation to bands in the image. The bands are introduced by system characteristics such as drop weight variation through the print head, imperfect print head alignment, or chatter in the carriage. Similar non-uniformity banding is seen in piezoelectric print heads.

Evaluating print quality is typically done manually by an experienced technician who grades the print quality visually. Because this approach requires a technician, it can be quite expensive and the results are often inconsistent.

BRIEF DESCRIPTION OF THE DRAWINGS

FIG. 1 is a high-level illustration of an exemplary print system which may implement print head calibration.

FIG. 6 is a flowchart illustrating exemplary operations which may be implemented for print head calibration.

DETAILED DESCRIPTION

Figure 1A:
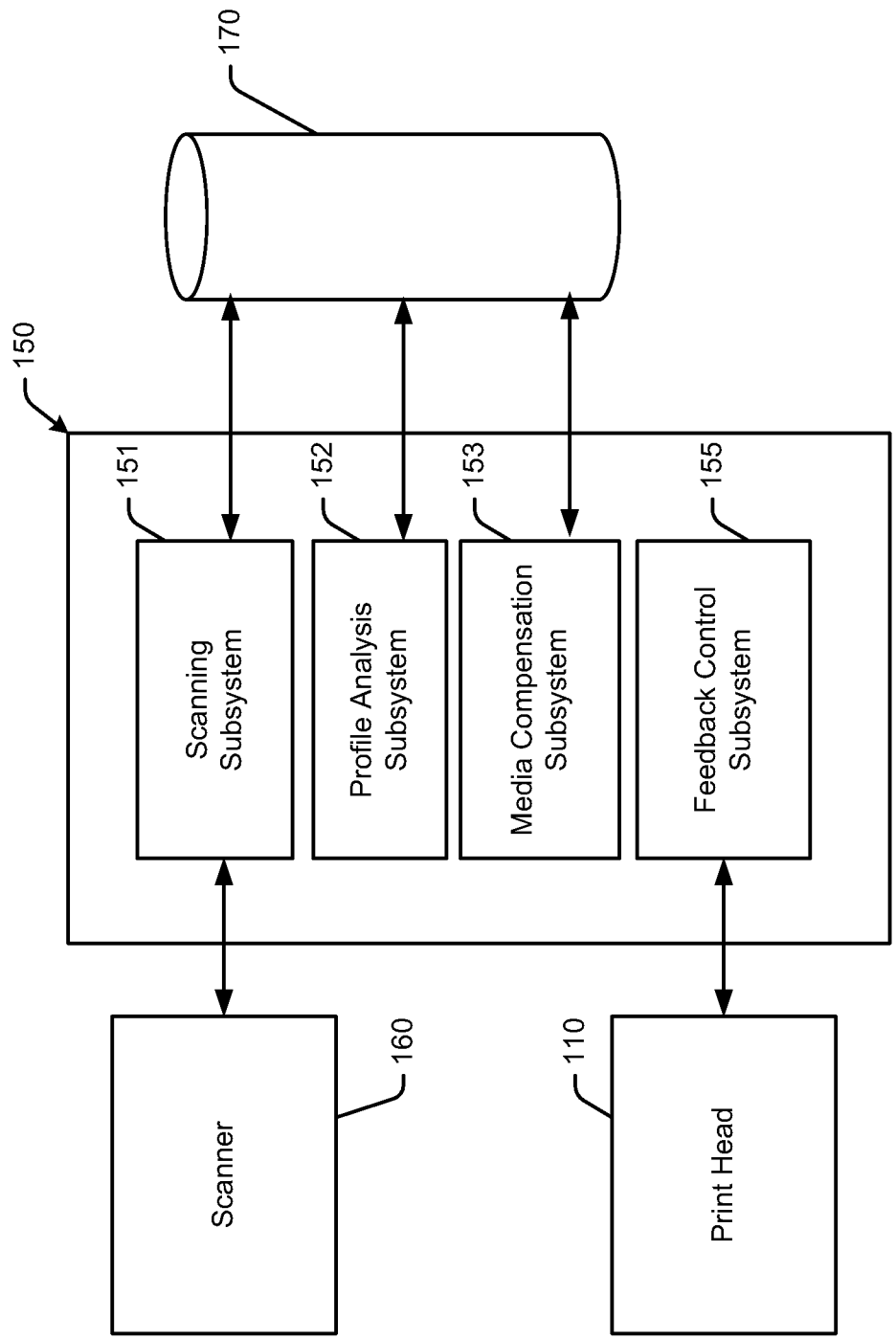
FIG. 1a is a block diagram showing an exemplary calibration system which may implement print head calibration.

Exemplary systems and methods for print head calibration are disclosed. In an exemplary embodiment, the systems and methods are implemented to automatically detect color uniformity defects using a sensor such as an inexpensive light emitting diode (LED)-based densitometer. When implemented in stand-alone print systems, such as Page Wide Array (PWA) printers, the calibration processes enable self-diagnostics and automatic detection of defects in the print quality.

The systems and methods disclosed herein may reduce the impact on the environment, reduce costs, and increase overall customer satisfaction with print systems. In addition to providing better print quality, the calibration algorithms may be implemented on an as-needed basis to reduce the use of paper and ink. In addition, the generation of service calls may be limited to circumstances in which the system cannot self-calibrate, thereby reducing technician visits.

Exemplary Systems

FIG. 1 is a high-level illustration of an exemplary print system 100 which may implement print head calibration. Exemplary print system 100 may be a PWA color inkjet printer, such as those commercially available from Hewlett-Packard Co. (Palo Alto, Calif.). Other suitable printers now known or later developed may also be used as will be readily appreciated by those having ordinary skill in the art after becoming familiar with the teachings herein.

Print system 100 may include one or more print heads such as print head 110 provided over a print media 120 (e.g., paper) as the print media 120 is fed through the printer (e.g., in the directions illustrated by arrow 130). Print head 110 may be a multi-die print head having print dies 111-115. It is noted, of course, that print head 110 is not limited to any particular number or arrangement of print dies. The configuration shown in FIG. 1 is merely illustrative of an exemplary embodiment.

Optionally, an external control panel 140 may be provided for input/output by a user. Also optionally, the print system 100 may be operatively associated with an external device (not shown), such as a computer or other electronic device for input/output by the device.

An internal control system (not shown) may be operatively associated with a driving mechanism (not shown) to move a feed mechanism (not shown) to move the print media 120 adjacent the print head 110 in the direction illustrated by arrow 130. The controller may also be operatively associated with one or more ink cartridges fluidically connected to the print dies 111-115 to control the flow of ink for transfer on the print media 120 (e.g., as illustrated in FIG. 1 by image portions 121-125 corresponding to print dies 111-115, respectively, on print media 120).

It can be readily appreciated that the amount of ink from each print die 111-115 must be carefully controlled in order to print an image having a consistent print quality across the print media. A control system for calibrating the print head is described in more detail now with reference to FIG. 1a.

FIG. 1a is a block diagram showing exemplary calibration system 150 which may implement print head calibration, e.g., for the print system 100 shown in FIG. 1. The calibration system may include a number of subsystems. The subsystems may be implemented as program code (e.g., firmware or software) and/or as logic components.

In an exemplary embodiment, the calibration system 150 may comprise a scanning subsystem 151. Scanning subsystem 151 may be operatively associated with a scanner 160. In an exemplary embodiment, the scanner is a (LED)-based densitometer configured to scan an image on a print media. The scanning subsystem 151 receives output from the scanner 160 and records the output as an optical density profile, e.g., in storage 170.

In an exemplary embodiment, the densitometer sensor includes a plurality of multi-colored LEDs. Specific LED colors are used for sensing specific color bands. Also in an exemplary embodiment, a composite color having multiple colorants is used for sensing color uniformity during the calibration. A composite color magnifies color non-uniformity and is closer to what the end user would achieve during normal use.

A profile analysis subsystem 152 is operable to select at least one window in the optical density profile, and generates an average profile for each window to identify variations in uniformity. Optionally, a media compensation subsystem 153 may be used to compensate for variations in the print media. For example, the scanning subsystem may scan a blank media to obtain baseline optical readings. The media compensation subsystem may then divide the optical density profile by the baseline optical readings to compensate for variations in the print media.

A feedback control subsystem is operatively associated with the print head 110 to correct variations in uniformity. For example, the feedback control subsystem may increase/decrease or otherwise adjust the amount of ink deposited by each of the print dies 111-115 (FIG. 1), or portions of the print dies (e.g., the portions of the print dies overlapping with one another).

Before continuing, it is noted that the systems and methods described herein are not limited to the print system 100 and calibration system 150 described above with reference to FIGS. 1 and 1a, respectively. Other print systems and embodiments of the calibration system which may benefit from implementation of the described systems and methods will be readily appreciated by those having ordinary skill in the art after becoming familiar with the teachings herein.

Operation of the print system 100 shown in FIG. 1 and the subsystems shown in FIG. 1a can be better understood using the example described below with reference to FIGS. 2-5.

Figure 2:
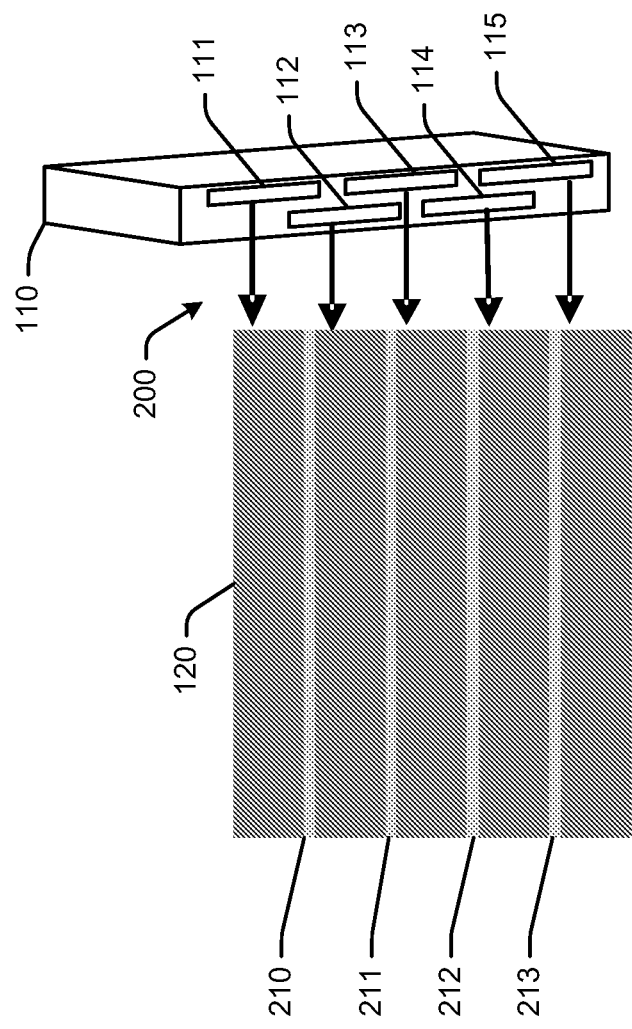
FIG. 2 is an illustration of an exemplary print head which has not been calibrated showing variation in image quality.

FIG. 2 is an illustration of an exemplary print head 110 which has not been calibrated showing variation in image quality. In particular, it can be seen that output (illustrated by arrows 200) from the print dies 111-115 may result in an image having non-uniform print quality.

Defects in print quality may appear as "banding." In FIG. 2, for example, the image formed on print media 120 is shown having streaks or light areas 210-213 corresponding to drop weight variation within the print dies 111-115.

Figure 3:
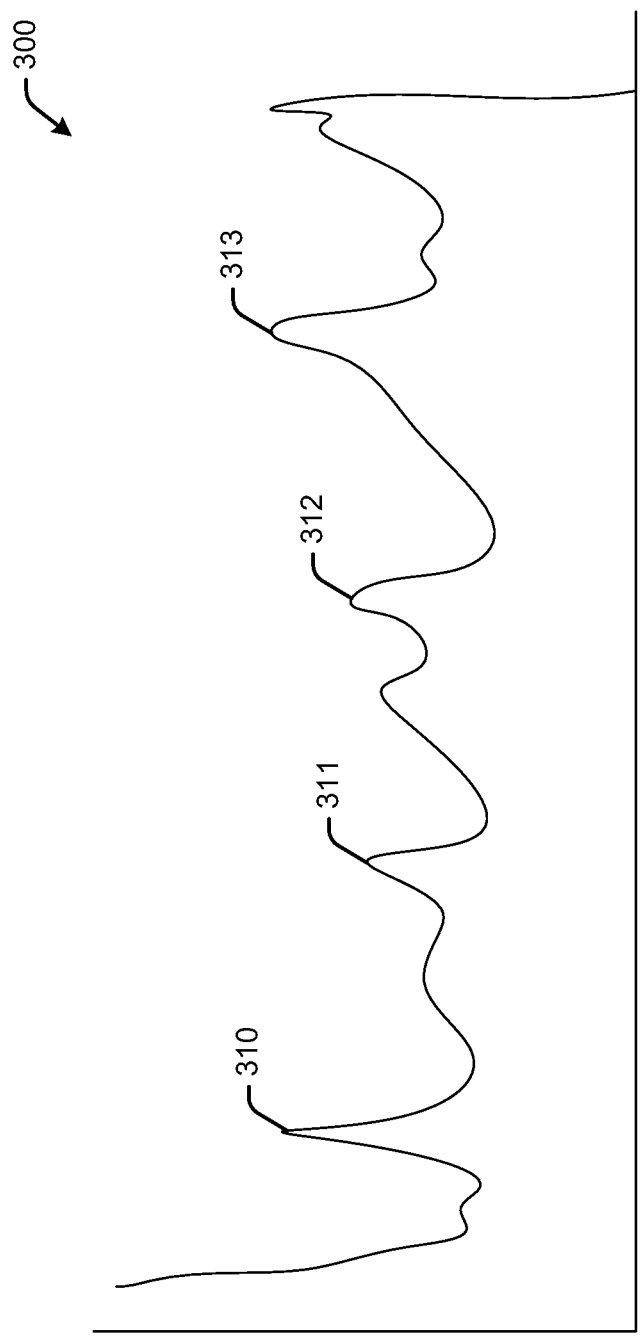
FIG. 3 is an exemplary optical density profile showing four light bands causing variation in image quality.

The image may be scanned using an optical scanner (e.g., scanner 160 in FIG. 1a) and the optical density may be recorded by the scanning subsystem 151 (FIG. 1a) as an optical density profile. FIG. 3 is an exemplary optical density profile 300 showing four light bands (e.g., the light bands 210-213 shown in FIG. 2) causing variation in image quality. The light bands appear in the optical density profile 300 as peaks 310-313, respectively.

Figure 4:
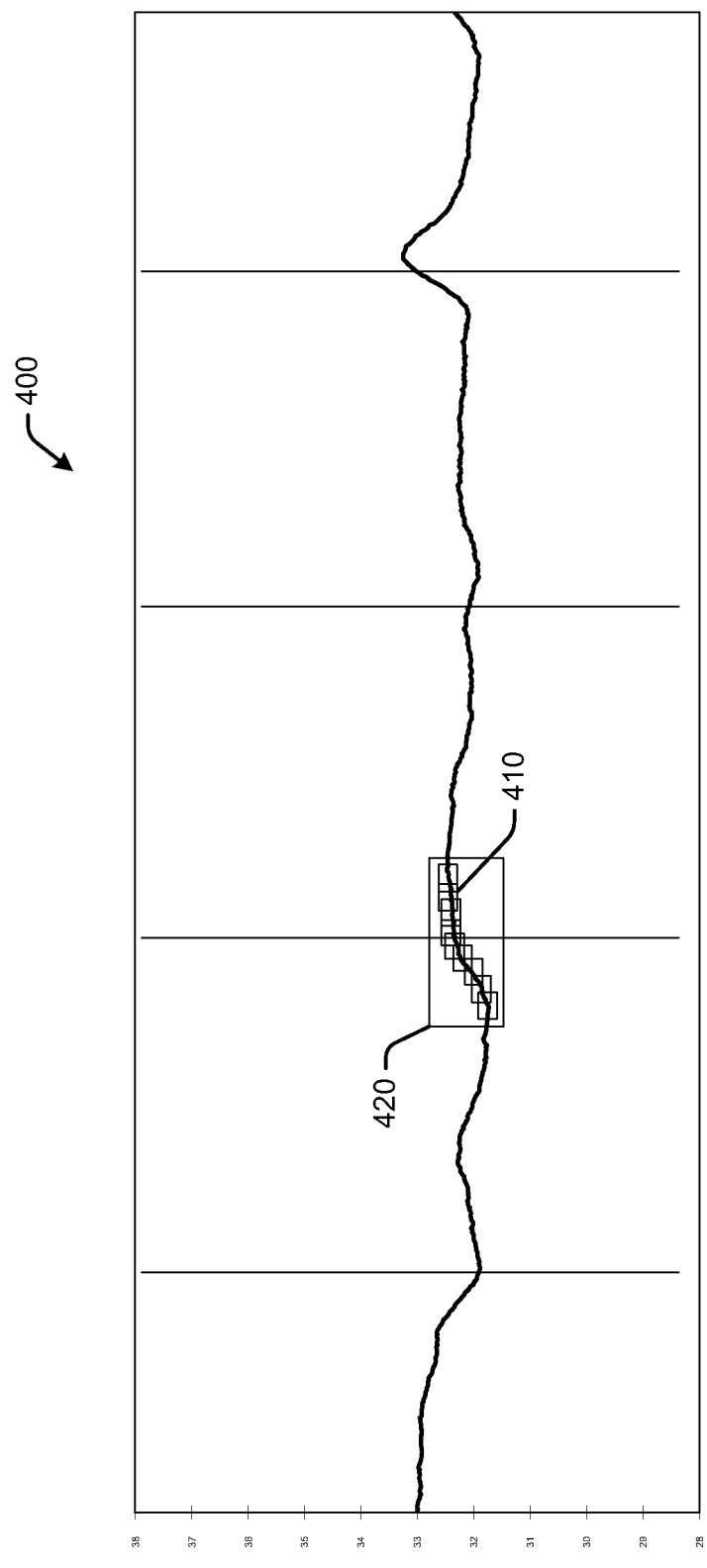
FIG. 4 is an exemplary optical density profile of an image.
Figure 5:
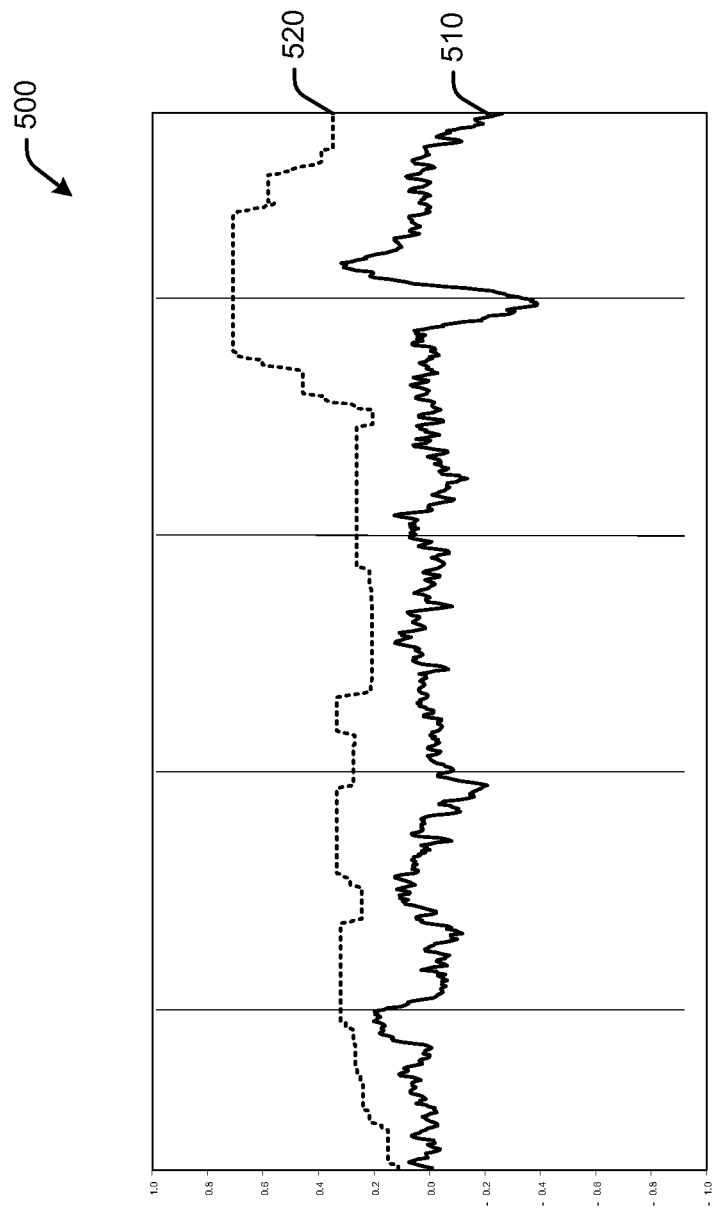
FIG. 5 is a plot of exemplary output from a uniformity algorithm.

Banding may be corrected (i.e., reduced so as not to be visible to the naked eye) using the calibration systems and methods described herein. In an exemplary embodiment, the profile analysis subsystem 152 (FIG. 1a) may be invoked to analyze the optical density profile 300 (FIG. 3). FIG. 4 is an exemplary optical density profile 400 of an image, as it may be graded for color uniformity assessment, e.g., by the profile analysis subsystem. FIG. 5 is a plot 500 that illustrates exemplary output from a uniformity algorithm run, e.g., by the profile analysis subsystem, on an optical density profile such as profile 400.

Referring to the optical density profile 400 (FIG. 4), a smooth transition from light to dark is not visually objectionable so the uniformity algorithm may focus on light to dark changes in small areas or "windows" 410. Smoothness can be measured as a running average of local derivatives 420 in the sensor measurement. Because human vision is more sensitive to sudden changes, a larger masked derivative is applied to windows 410 to obtain a data profile for window 420. That is, local derivatives are calculated on the profile (slope within each window 410) to create a running average of change in the profile calculated in each window 410 as shown by the plot 510 in FIG. 5.

Uniformity variation can then be calculated by subtracting the maximum and minimum slopes within each window 420 to create the plot 520 shown in FIG. 5. The largest value on the plot 520 corresponds to the most non-uniformity in the image.

The feedback control subsystem 155 (FIG. 1a) may then be invoked to adjust the ink density deposited by one or more of the print dies 110-115 (FIGS. 1 and 2) to correct or reduce visible banding. The calibration procedure may repeat until the banding has been corrected to the desired level. The desired level may be set using threshold values. In an exemplary embodiment, thresholds are selected to represent about 1 delta E (where E is the optical density) as may be scanned at a 45 degree scanner reading angle.

It is noted that the construction and operation of print systems described above are well understood in the computer and printer arts and therefore further description is not necessary for a full understanding of the systems and methods described herein.

Exemplary Operations

FIG. 6 is a flowchart illustrating exemplary operations which may be implemented for print head calibration. In an exemplary embodiment, operations 600 may be embodied as logic instructions on one or more computer-readable media. When executed on a processor, the logic instructions cause a general purpose computing device to be programmed as a special-purpose machine that implements the described operations. The components and connections depicted in the figures may be used for print head calibration.

Operations begin at 610 by entering the calibration procedure. In exemplary embodiments, the calibration procedure is only entered on an as-needed basis, e.g., when print quality deteriorates beyond a predetermined threshold. In operation 620, an image on a print media is scanned to obtain an optical density profile. In operation 630, at least one window is selected in the optical density profile. In operation 640, an average change in the profile is generated for each window. In operation 650, variations in uniformity are identified.

In operation 660, a determination is made whether the variations in uniformity satisfy a threshold value. If the threshold is satisfied, meaning that print quality is sufficient, then the calibration procedure ends in operation 661. If the threshold is not satisfied, meaning that print quality is insufficient, then variations are corrected in operation 662 (e.g., by adjusting ink density). The calibration procedure is then repeated by returning to operation 620.

The operations shown and described herein are provided to illustrate exemplary implementations for print head calibration. It is noted that the operations are not limited to the ordering shown. In addition, other operations may also be implemented.

In an exemplary embodiment, operations may further include compensating for variation in the print media. For example, a blank media may be scanned to obtain baseline optical readings. The optical density profile may then be divided by the baseline optical readings.

The exemplary embodiments shown and described herein are provided for purposes of illustration and are not intended to be limiting. Still other embodiments of systems and methods are also contemplated for print head calibration.

The invention claimed is:

1. A method for calibrating print heads, comprising:
scanning an image on a print media to obtain an optical density profile, the optical density profile representing output from a plurality of print dies;
selecting a plurality of windows in the optical density profile;
generating an average profile for each selected window; and
identifying variations in uniformity, based on the average profile for each window.

2. The method of claim 1, further comprising correcting for variations in uniformity by adjusting ink deposition by the print head based on the identified variations in uniformity.

3. The method of claim 1, wherein generating the average profile for each window includes calculating local slopes within each of a plurality of windows.

4. The method of claim 1, wherein identifying variations in uniformity includes subtracting maximum and minimum slopes within each of the plurality of windows.

5. The method of claim 1, wherein at least one peak in the average profile corresponds with the greatest non-uniformity in the image.

6. The method of claim 1, further comprising compensating for variation in the print media by scanning a blank media to obtain baseline optical readings and then dividing the optical density profile by the baseline optical readings.

7. The method of claim 1, further comprising calibrating the print head only if variations in uniformity exceed a selected threshold.

8. The method of claim 7, further comprising selecting the threshold as being about 1 delta E as measured at a 45 degree scanner reading angle.

9. A print head calibration system, comprising:
a scanning subsystem configured to scan an image on a print media and record a single optical density profile for output of a plurality of print dies;
a profile analysis subsystem operable to select windows in the optical density profile, generate an average profile for each window, and identify variations in uniformity; and
a feedback control subsystem operatively associated with a print head to correct variations in uniformity based on output from the profile analysis subsystem.

10. The system of claim 9, wherein the profile analysis subsystem generates the average profile for each window by calculating local slopes within each window.

11. The system of claim 9, wherein the profile analysis subsystem identifies variations in uniformity by subtracting maximum and minimum slopes within each window.

12. The system of claim 9, further comprising a media compensation subsystem to compensate for variation in the print media.

13. The system of claim 9, further comprising an LED-based scanner operatively associated with the scanning subsystem to generate the optical density profile.

14. The system of claim 13, wherein the LED-based scanner includes a plurality of multi-colored LEDs for scanning a composite color image to generate the optical density profile for composite color images.

15. The system of claim 9, wherein the calibration system is invoked only if variations in uniformity exceed a selected threshold.

* * * * *